(12) United States Patent
Petersson et al.

(10) Patent No.: US 10,219,268 B2
(45) Date of Patent: Feb. 26, 2019

(54) BEAM FINDING PROCEDURE

(71) Applicant: TELEFONAKTIEBOLAGET LM ERICSSON (PUBL), Stockholm (SE)

(72) Inventors: Sven Petersson, Sävedalen (SE); Fredrik Athley, Kullavik (SE); Andreas Nilsson, Göteborg (SE); Henrik Sahlin, Mölnlycke (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 161 days.

(21) Appl. No.: 15/302,627

(22) PCT Filed: Sep. 23, 2016

(86) PCT No.: PCT/EP2016/072667
§ 371 (c)(1),
(2) Date: Oct. 7, 2016

(87) PCT Pub. No.: WO2018/054479
PCT Pub. Date: Mar. 29, 2018

(65) Prior Publication Data
US 2018/0176896 A1   Jun. 21, 2018

(51) Int. Cl.
*H04W 72/04* (2009.01)
*H04B 7/0408* (2017.01)
*H04B 7/08* (2006.01)
*H04L 5/00* (2006.01)
*H04W 72/06* (2009.01)
(Continued)

(52) U.S. Cl.
CPC ........ *H04W 72/044* (2013.01); *H04B 7/0695* (2013.01); *H04L 5/0048* (2013.01); *H04W 72/06* (2013.01); *H04W 72/085* (2013.01)

(58) Field of Classification Search
CPC . H04W 72/044; H04W 72/085; H04W 72/06; H04L 5/0048
See application file for complete search history.

(56) References Cited

U.S. PATENT DOCUMENTS

| 2014/0055302 | A1  | 2/2014  | Jia |
| 2017/0303263 | A1* | 10/2017 | Islam ............... H04B 7/0408 |
| 2017/0346545 | A1* | 11/2017 | Islam ............... H04B 7/0814 |

FOREIGN PATENT DOCUMENTS

EP          3038272 A1      6/2016

OTHER PUBLICATIONS

International Search Report and the Written Opinion of the International Searching Authority, issued in corresponding International Application No. PCT/EP2016/072667, dated May 17, 2017 10 pages.

* cited by examiner

*Primary Examiner* — Kiet Tang
(74) *Attorney, Agent, or Firm* — Rothwell, Figg, Ernst & Manbeck, P.C.

(57) ABSTRACT

There is provided mechanisms for receiving transmission resources using beams. A method is performed by a wireless radio transceiver device. The method comprises receiving, using a first beam, a current transmission resource from an access node using a first transmission format. The method comprises transmitting an indicator to the access node to use a second transmission format for a later transmission resource to be transmitted to the wireless radio transceiver device. The method comprises receiving the later transmission resource at least partly using a candidate beam, where the candidate beam is different from the first beam.

20 Claims, 4 Drawing Sheets

(51) Int. Cl.
*H04W 72/08* (2009.01)
*H04B 7/06* (2006.01)

BEAM FINDING PROCEDURE

CROSS REFERENCE TO RELATED APPLICATION(S)

This application is a 35 U.S.C. § 371 National Phase Entry Application from PCT/EP2016/072667, filed Sep. 23, 2016, designating the United States, the disclosure of which is incorporated herein in its entirety by reference.

TECHNICAL FIELD

Embodiments presented herein relate to a method, a wireless radio transceiver device, a computer program, and a computer program product for receiving transmission resources using beams.

BACKGROUND

In communications networks, there may be a challenge to obtain good performance and capacity for a given communications protocol, its parameters and the physical environment in which the communications network is deployed.

For example, for future generations of mobile communications systems frequency bands at many different carrier frequencies could be needed. For example, low such frequency bands could be needed to achieve sufficient network coverage for wireless radio transceiver devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the access node of the network and at the wireless radio transceiver devices might be required to reach a sufficient link budget.

The wireless radio transceiver devices could implement beamforming by means of analog beamforming, digital beamforming, or hybrid beamforming. Each implementation has its advantages and disadvantages. A digital beamforming implementation is the most flexible implementation of the three but also the costliest due to the large number of required radio chains and baseband chains. An analog beamforming implementation is the least flexible but cheaper to manufacture due to a reduced number of radio chains and baseband chains compared to the digital beamforming implementation. A hybrid beamforming implementation is a compromise between the analog and the digital beamforming implementations. As the skilled person understands, depending on cost and performance requirements of different wireless radio transceiver devices, different implementations will be needed.

When the wireless radio transceiver devices uses analog beamforming it could be challenging for the wireless radio transceiver devices to determine if a currently used beam produced by using the analog beamforming is a good beam in terms of a given signal quality criterion or if there exist other beams that if generated by the analog beamforming would perform significantly better in terms of the given signal quality criterion. In order to evaluate if any other such beam is better a beam finding procedures, for example using beam reference signals (BRS), could be used. However, performing such a procedure typically requires comparatively much overhead signaling between the access node and the wireless radio transceiver device which, thus, will temporarily degrade the performance in the network.

Hence, there is a need for an improved beam finding procedure.

SUMMARY

An object of embodiments herein is to enable efficient beam finding for a wireless radio transceiver device.

According to a first aspect there is presented a method for receiving transmission resources using beams. The method is performed by a wireless radio transceiver device. The method comprises receiving, using a first beam, a current transmission resource from an access node using a first transmission format. The method comprises transmitting an indicator to the access node to use a second transmission format for a later transmission resource to be transmitted to the wireless radio transceiver device. The method comprises receiving the later transmission resource at least partly using a candidate beam, where the candidate beam is different from the first beam.

Advantageously this provides efficient reception of transmission resources when using beams. Such an efficient reception of transmission resources can be used during beam finding for the wireless radio transceiver device.

Advantageously this method enables the wireless radio transceiver devices to test any number of candidate beams in order to improve the link budget and thus increase throughput in terms of bits per seconds without a large overhead.

According to a second aspect there is presented a wireless radio transceiver device for receiving transmission resources using beams. The wireless radio transceiver device comprises processing circuitry. The processing circuitry is configured to cause the wireless radio transceiver device to receive, using a first beam, a current transmission resource from an access node using a first transmission format. The processing circuitry is configured to cause the wireless radio transceiver device to transmit an indicator to the access node to use a second transmission format for a later transmission resource to be transmitted to the wireless radio transceiver device. The processing circuitry is configured to cause the wireless radio transceiver device to receive the later transmission resource at least partly using a candidate beam, where the candidate beam is different from the first beam.

According to a third aspect there is presented a wireless radio transceiver device for receiving transmission resources using beams. The wireless radio transceiver device comprises processing circuitry and a computer program product. The computer program product stores instructions that, when executed by the processing circuitry, causes the wireless radio transceiver device to perform operations, or steps. The operations, or steps, cause the wireless radio transceiver device to receive, using a first beam, a current transmission resource from an access node using a first transmission format. The operations, or steps, cause the wireless radio transceiver device to transmit an indicator to the access node to use a second transmission format for a later transmission resource to be transmitted to the wireless radio transceiver device. The operations, or steps, cause the wireless radio transceiver device to receive the later transmission resource at least partly using a candidate beam, where the candidate beam is different from the first beam.

According to a fourth aspect there is presented a wireless radio transceiver device for receiving transmission resources using beams. The wireless radio transceiver device comprises a receive module configured to receive, using a first beam, a current transmission resource from an access node using a first transmission format. The wireless radio transceiver device comprises a transmit module configured to transmit an indicator to the access node to use a second transmission format for a later transmission resource to be transmitted to the wireless radio transceiver device. The wireless radio transceiver device comprises a receive module configured to receive the later transmission resource at least partly using a candidate beam, where the candidate beam is different from the first beam.

According to a fifth aspect there is presented a computer program for receiving transmission resources using beams, the computer program comprising computer program code which, when run on a wireless radio transceiver device, causes the wireless radio transceiver device to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
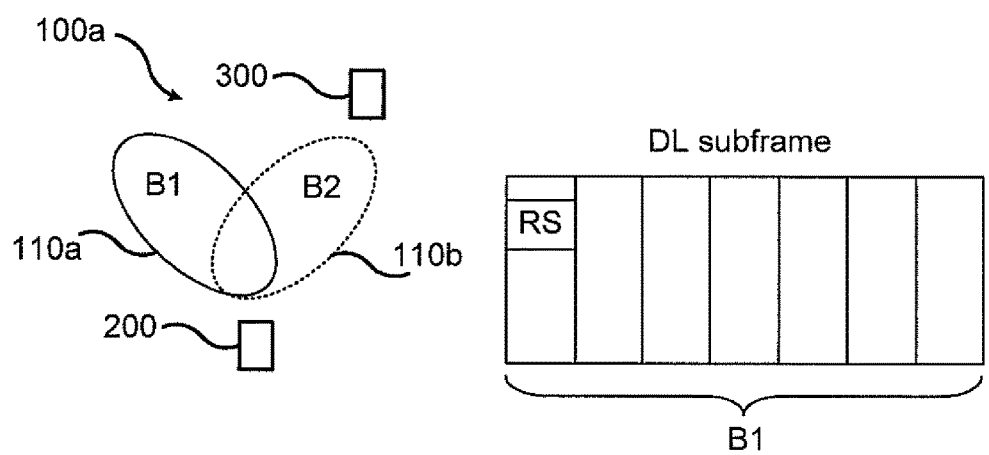
FIG. 1 is a schematic diagram illustrating a communications network according to embodiments.

FIG. 1(a) is a schematic diagram illustrating a communications network 100a (left-hand side) and a corresponding downlink (DL) subframe including one single Reference Signal (RS) for demodulation and measurements (right-hand side) according to state of the art.

The communications network 100a comprises an access node 300 providing network access to a wireless radio transceiver device 200. The access node 300 could be any of a radio access network node, radio base station, base transceiver station, node B, evolved node B, or access point. The wireless radio transceiver device 200 could be any of portable wireless device, mobile station, mobile phone, handset, wireless local loop phone, user equipment (UE), smartphone, laptop computer, tablet computer, or wireless sensor.

The wireless radio transceiver device 200 transmits signals to, and receives signals from, the access node 300 in a beam 110a denoted B1 during the entire subframe. Assume that the wireless radio transceiver device 200 seeks to evaluate another candidate beam 110b denoted B2 (by for example measuring reference symbol received power (RSRP) in the candidate beam) for transmission to, and reception from, the access node 300. However, since the downlink subframe includes only a single Reference Signal for demodulation and measurements the wireless radio transceiver device 200 cannot temporarily switch to another candidate beam during this subframe in order to evaluate the candidate beam in a reliable way (by measuring on a reference symbol).

The embodiments disclosed herein enable the wireless radio transceiver device 200 to evaluate the candidate beam 110b. In general terms, and as will be further disclosed below, the wireless radio transceiver device 200 transmits an indication (either explicitly or implicitly) to the access node 300 to use a transmission format that enables the wireless radio transceiver device 200 to evaluate at least one candidate beam 110b in a reliable way (by measuring on a reference symbol).

The embodiments disclosed herein thus relate to mechanisms for receiving transmission resources using beams 110a, 110b. In order to obtain such mechanisms there is provided a wireless radio transceiver device 200, a method performed by the wireless radio transceiver device 200, a computer program product comprising code, for example in the form of a computer program, that when run on a wireless radio transceiver device 200, causes the wireless radio transceiver device 200 to perform the method.

Figures 2, 3:
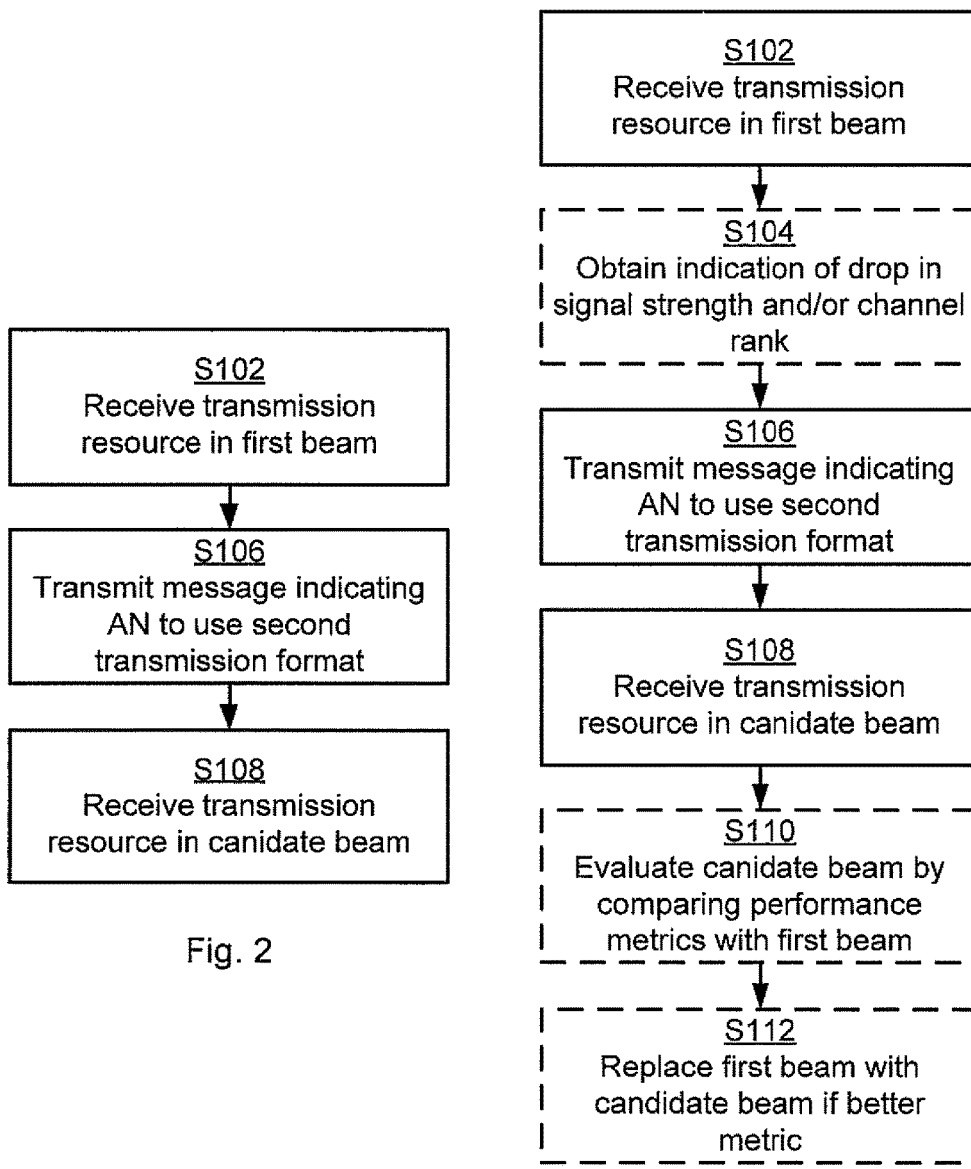
FIGS. 2, 3, and 4 are flowcharts of methods according to embodiments.

FIGS. 2 and 3 are flow charts illustrating embodiments of methods for receiving transmission resources using beams 110a, 110b. The methods are performed by the wireless radio transceiver device 200. The methods are advantageously provided as computer programs 720.

Reference is now made to FIG. 2 illustrating a method for receiving transmission resources using beams 110a, 110b as performed by the wireless radio transceiver device 200 according to an embodiment.

S102: The radio transceiver device 200 receives, using a first beam 110a, a current transmission resource from the access node 300 using a first transmission format.

It assumed that the radio transceiver device 200 seeks to evaluate another candidate beam 110b for transmission to, and reception from, the access node 300 but seeks to avoid the issues noted above. The radio transceiver device 200 is therefore configured to perform step S106:

S106: The radio transceiver device 200 transmits an indicator to the access node 300 to use a second transmission format for a later transmission resource to be transmitted to the wireless radio transceiver device 200. Examples of such indicators will be provided below. Examples of differences between the first transmission format and the second transmission format will be provided below.

It is assumed that the access node 300 receives the indication and in response thereto transmits the later transmission resource to the wireless radio transceiver device 200 using the second transmission format. Hence, the radio transceiver device 200 is configured to perform step S108:

S108: The radio transceiver device zoo receives the later transmission resource at least partly using a candidate beam 110b. The candidate beam 110b is different from the first beam 110a. By different means that the candidate beam 110b at least has a different pointing direction and/or polarization, and possibly also beam width, than the first beam 110a.

Embodiments relating to further details of receiving transmission resources using beams 110a, 110b as performed by the wireless radio transceiver device 200 will now be disclosed.

Figure 1B:
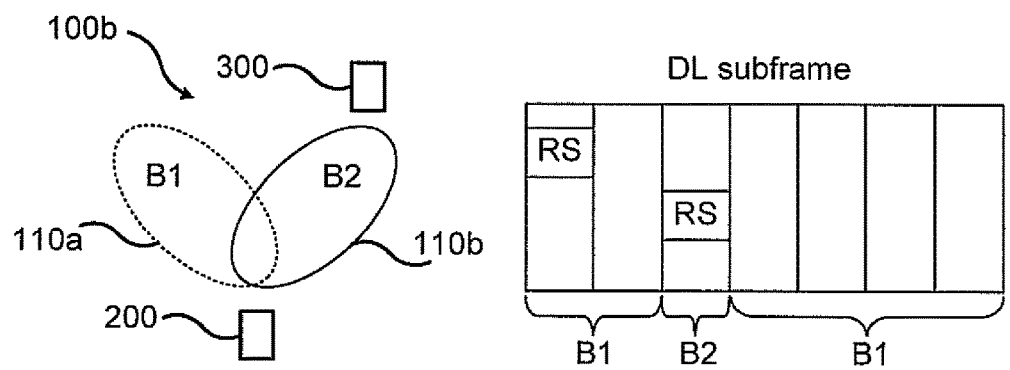

Reference is now made to FIG. 3 illustrating methods for receiving transmission resources using beams 110a, 110b as performed by the wireless radio transceiver device 200 according to further embodiments. It is assumed that steps S102, S106, S108 are performed as described above with reference to FIG. 2 and a thus repeated description thereof is therefore omitted FIG. 1(b) is a schematic diagram illustrating a communications network mob (left-hand side) and a corresponding downlink (DL) subframe including two single Reference Signals (RS) for demodulation and measurements (right-hand side) according to an embodiment. FIG. 1(b) illustrates an embodiment where the wireless radio transceiver device 200 performs (analog) beamforming using two different beams 110a, 110b, one of which being a first beam 110a (denoted B1) and another of which being a candidate beam 110b (denoted B2). The right-hand side of FIG. 1(b) illustrates how the wireless radio transceiver device 200 switches between the two beams B1, B2 in order to evaluate the performance of the candidate beam B2. During reception of the subframe the wireless radio transceiver device 200 thus switches from reception using beam B1 to reception using beam B2 in order to use B2 in the time/frequency resource that contains at least one reference signal. The wireless radio transceiver device 200 can then evaluate if beam B2 is more suitable than beam B1. As soon as the evaluation is completed the wireless radio transceiver device 200 switches to the best beam (thus either beam B1 or B2. Until the evaluation is completed the wireless radio transceiver device 200 uses the first beam B1.

Although FIG. 1(b) refers to beamforming using two different beams 110a, 110b, the herein disclosed embodiments are not limited to the use of a first beam 110a and one candidate beam 110b; the herein disclosed embodiments are applicable to any number of candidate beams 110b and hence the wireless radio transceiver device 200 could be configured to evaluate multiple such candidate beams 110b during reception of the later transmission resource using the second transmission format.

There may be different triggers for when the wireless radio transceiver device 200 should transmit the indication and thus perform step S106. For example, the wireless radio transceiver device 200 could be configured to transmit the indication when the signal strength has dropped below a threshold signal strength value, dropped at a rate higher than a threshold rate value, or that the rank in the radio channel is worse than a threshold rank value. Hence, according to an embodiment the radio transceiver device 200 is configured to perform step S104:

S104: The radio transceiver device 200 obtains an indication of at least one of drop in signal strength and channel rank of the transmission from the access node 300, and the indicator to use the second transmission format is transmitted in response thereto.

For example, the wireless radio transceiver device 200 could be configured to at regular time intervals, such as periodically, evaluate candidate beams in order to investigate if there are any better beams than the ones currently used. Hence, according to an embodiment the indication in step S106 is transmitted according to a schedule.

There could be different ways for the wireless radio transceiver device 200 to indicate to the access node to use the second transmission format.

According to an embodiment, an explicit signaling is used which can for example be a signal known both at the wireless radio transceiver device 200 and the access node 300 such that the access node 300 knows that the wireless radio transceiver device 200 will perform beam training and hence uses a transmission format accordingly. Hence, according to an embodiment the indicator transmitted in step S106 requests the access node 300 to enable the wireless radio transceiver device 200 to evaluate a candidate beam 110b. For example, the indicator could be a dedicated candidate beam evaluation message.

According to an embodiment, implicit signaling is used, for example the wireless radio transceiver device 200 can signal a reduced Signal to Interference and Noise Ratio (SINR), such that the access node 300 increases the density of reference signals and uses a stronger coding of the data signals. One example of implicit signaling is thus that the wireless radio transceiver device 200, with purpose, signals a faked reduced SINR, which could lead to the access node 300 using an increased density of reference signals and a reduced modulation and coding scheme (MCS). Hence, according to an embodiment the indicator transmitted in step S106 is a message comprising at least one of a Channel Quality Indictor, and Rank Indicator.

There could be different ways to differentiate the second transmission format from the first transmission format. According to some aspects the wireless radio transceiver device 200 is enabled more measurements opportunities in the second transmission format compared to the first transmission format. According to an embodiment the wireless radio transceiver device 200 is provided with more measurement opportunities, e.g., for measuring on reference signals, in the second transmission format than in the first transmission format. Hence, according to this embodiment the second transmission format has a higher density of reference signals than the first transmission format. With reference to FIGS. 1(a) and (b) the wireless radio transceiver device 200 is provided with one single measurement opportunity in the DL subframe of FIG. 1(a) and two measurement opportunities in the DL subframe of FIG. 1(b).

One purpose for the access node 300 to increase the reference symbol density is hence that the wireless radio transceiver device 200 thereby is allowed to evaluate candidate beams 110b more often. One reason for decreasing the MCS is that in case the candidate beam 110b is worse than the original first beam 110a the SINR of the downlink data signals will deteriorate during the beam searching procedure and hence a more robust coding of the data signals is needed in order for the wireless radio transceiver device 200 to correctly demodulate the data signals.

For example, assuming that one DL subframe corresponds to a transmission resource the access node 300 could thus transmit reference signals more frequently in the second transmission format than in the first transmission format. Hence, according to an embodiment more reference signals per transmission resource are transmitted by the access node 300 in the second transmission format than in the first transmission format.

The wireless radio transceiver device 200 has knowledge about which time/frequency resources that contain a reference signal. This configuration of reference signals can be obtained by the wireless radio transceiver device 200 together with its downlink assignment on a control channel from the access node 300.

With change of transmission format is referred to that the access node 300 changes at least one of the reference symbol density (e.g. Channel State Information-Reference Signals (CSI-RS), demodulation reference signals (DMRS), position reference signals (PRS), beam reference signals (BRS), etc.) in time and/or frequency, and/or MCS. Particularly, according to an embodiment the second transmission format has a more robust coding and modulation scheme and/or more robust rank than the first transmission format.

The evaluation of the candidate beams can for example be performed by the wireless radio transceiver device 200 measuring received signal strength, absolute square of channel estimates, MSE (Mean Square Error) in channel estimation, MMSE (Minimum Mean Square Error) in demodulation, SNR, or SINR. That is, according to some aspects the radio transceiver device 200 evaluates a performance metric for the candidate beam 110b. Hence, according to an embodiment the radio transceiver device 200 is configured to perform step S110:

S110: The radio transceiver device 200 evaluates the candidate beam 110b by comparing performance metrics between the candidate beam 110b and the first beam 110a.

The first beam 110a could be replaced by the candidate beam 110b when the candidate beam 110b has better performance metric than the first beam 110a. Hence, according to an embodiment the radio transceiver device 200 is configured to perform step S112:

S112: The radio transceiver device 200 replaces the first beam 110a with the candidate beam 110b when the candidate beam 110b has better performance metric than the first beam 110a.

The performance metric could be based on received power of the current transmission and the later transmission.

There may be different ways for the radio transceiver device 200 to determine in which candidate beam 110b to receive the transmission resource in step S108. For example, the candidate beam 110b can be chosen based on earlier statistics, physical structure of the wireless radio transceiver device 200 and the antennas of the wireless radio transceiver device 200, etc. hence, according to an embodiment the candidate beam 110b has a pointing direction and beam width, and at least one of the pointing direction and the beam width is based on at least one of measurement statistics and physical properties of the wireless radio transceiver device 200.

There may be different examples of how many transmission resources the second transmission format is to be used. For example, the second transmission format could be used only temporary. Hence, according to an embodiment the second transmission format is used only in the later transmission resource.

There are different examples of transmission resources. In general terms, a transmission resource has a duration in time and frequency. According to an embodiment each transmission resource corresponds to a single orthogonal frequency-division multiplexing (OFDM) symbol, a single subframe, or a single Transmission Time Interval (TTI). However, alternatively, each transmission resource corresponds to multiple OFDM symbols, subframes, or TTIs.

Figure 4:
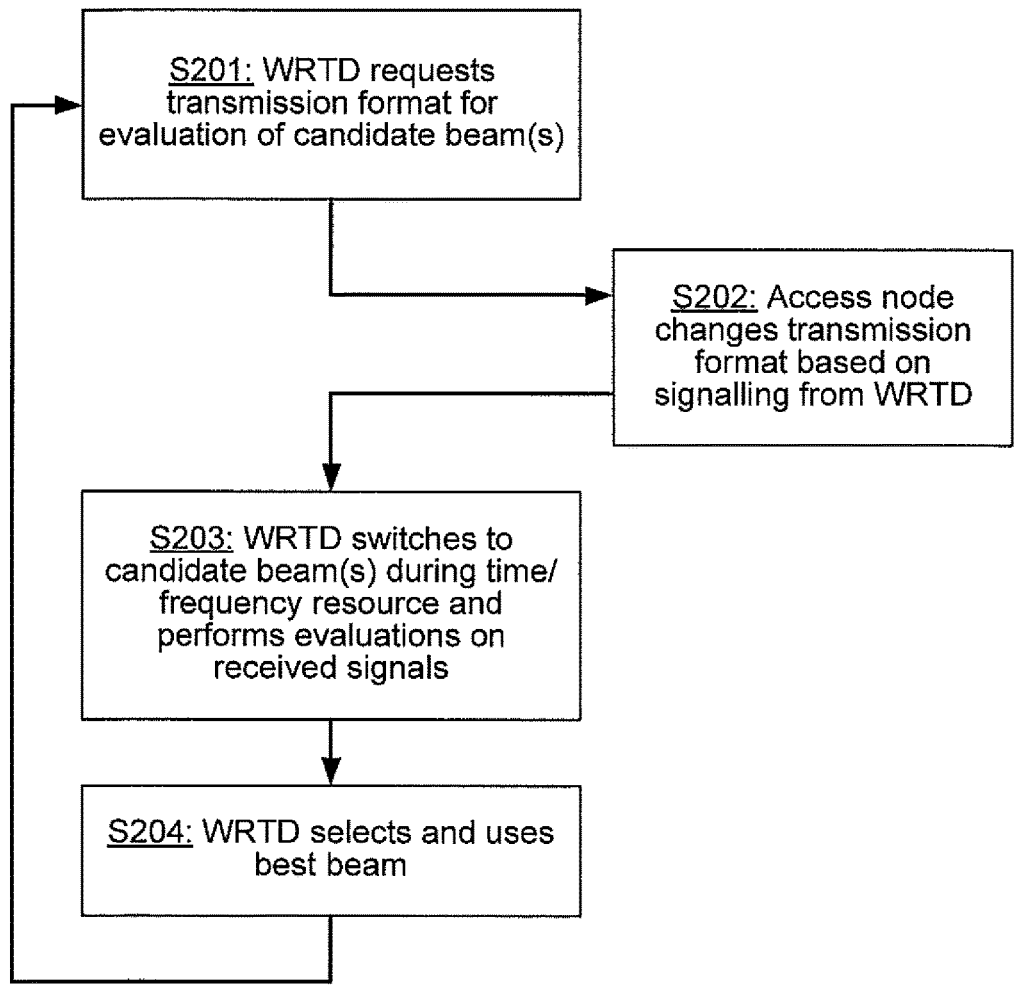

FIG. 4 is a flowchart of a particular embodiment for receiving transmission resources using beams 110a, 110b as performed by the wireless radio transceiver device 200 and the access node 300.

Step S201: The wireless radio transceiver device 200 determines to evaluate one or several candidate beams to be used during data transmission and/or reception. The wireless radio transceiver device zoo signals to the access node 300 to change to a transmission format that facilitates the beam searching at the wireless radio transceiver device 200. One way to implement step S201 is to perform any of steps S102, S104, and S106.

Step S202: The access node 300 changes transmission format during a transmission scheduled for this wireless radio transceiver device 200.

Step S203: The wireless radio transceiver device 200 receives the transmission from the access node 300 and during at least one time/frequency resources containing a reference symbol the wireless radio transceiver device 200 uses a candidate beam 110b for the reception. When the wireless radio transceiver device 200 has received reference signals in the different beams 110a, 110b it can evaluate which beam is the most preferred beam according to any of the above listed evaluation metrics. One way to implement step S203 is to perform any of step S108 and S110.

Step S204: The wireless radio transceiver device 200 selects the best beam based on the evaluation in step S203 and then uses this beam for future transmission and/or reception. Step S201 can be entered again either on a regular time interval basis or upon need. One way to implement step S204 is to perform step S112.

Figure 5:
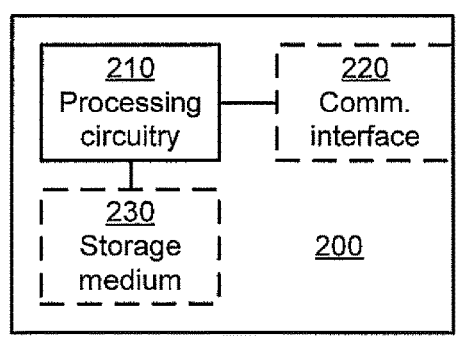
FIG. 5 is a schematic diagram showing functional units of a wireless radio transceiver device according to an embodiment.

FIG. 5 schematically illustrates, in terms of a number of functional units, the components of a wireless radio transceiver device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless radio transceiver device 200 to perform a set of operations, or steps, S102-S112, S201, S203, S204, as disclosed above. For example, the storage medium 230 may store the set of operations, and the processing circuitry 210 may be configured to retrieve the set of operations from the storage medium 230 to cause the wireless radio transceiver device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The wireless radio transceiver device 200 may further comprise a communications interface 220 at least configured for communications with the access node 300. As such the communications interface 220 may comprise one or more transmitters and receivers, comprising analogue and digital components. The processing circuitry 210 controls the general operation of the wireless radio transceiver device 200 e.g. by sending data and control signals to the communications interface 220 and the storage medium 230, by receiving data and reports from the communications interface 220, and by retrieving data and instructions from the storage medium 230. Other components, as well as the related functionality, of the wireless radio transceiver device 200 are omitted in order not to obscure the concepts presented herein.

Figure 6:
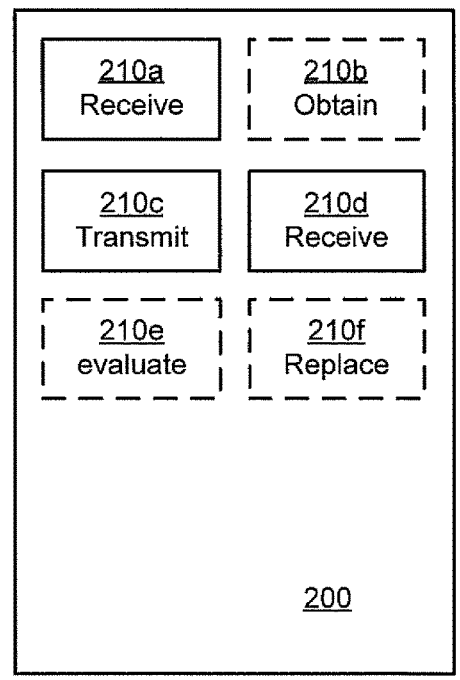
FIG. 6 is a schematic diagram showing functional modules of a wireless radio transceiver device according to an embodiment.

FIG. 6 schematically illustrates, in terms of a number of functional modules, the components of a wireless radio transceiver device 200 according to an embodiment. The wireless radio transceiver device 200 of FIG. 6 comprises a number of functional modules; a receive module 210a configured to perform step S102, a transmit module 210c configured to perform step S106, and a receive module 210d configured to perform step S108. The wireless radio transceiver device 200 of FIG. 6 may further comprises a number of optional functional modules, such as any of an obtain module 210b configured to perform step S104, an evaluate module 210e configured to perform step S110, and a replace module 210f configured to perform step S112. In general terms, each functional module 210a-210f may in one embodiment be implemented only in hardware or and in another embodiment with the help of software, i.e., the latter embodiment having computer program instructions stored on the storage medium 230 which when run on the processing circuitry makes the wireless radio transceiver device 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210a-210f may be implemented by the processing circuitry 210, possibly in cooperation with functional units 220 and/or 230. The processing circuitry 210 may thus be configured to from the storage medium 230 fetch instructions as provided by a functional module 210a-210f and to execute these instructions, thereby performing any steps as disclosed herein.

The radio transceiver device 200 may be provided as a standalone device or as a part of at least one further device. For example, the radio transceiver device 200 may be implemented in, part of, or co-located with, an access node or a wireless device. Hence, according to some aspects there is provided an access node and/or wireless device comprising a radio transceiver device 200 as herein disclosed.

Further, a first portion of the instructions performed by the radio transceiver device 200 may be executed in a first device, and a second portion of the of the instructions performed by the radio transceiver device 200 may be executed in a second device; the herein disclosed embodiments are not limited to any particular number of devices on which the instructions performed by the radio transceiver device 200 may be executed. Hence, the methods according to the herein disclosed embodiments are suitable to be performed by a radio transceiver device 200 residing in a cloud computational environment. Therefore, although a single processing circuitry 210 is illustrated in FIG. 5 the processing circuitry 210 may be distributed among a plurality of devices, or nodes. The same applies to the functional modules 210a-210f of FIG. 6 and the computer program 720 of FIG. 7 (see below).

Figure 7:
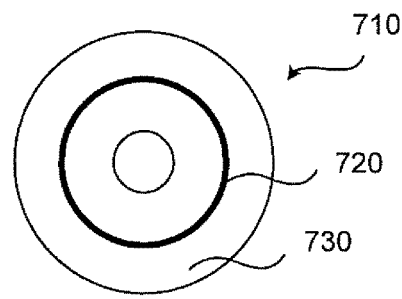
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for receiving transmission resources using beams, the method being performed by a wireless radio transceiver device, the method comprising:
   the wireless radio transceiver device receiving, using a first beam, a current transmission resource from an access node using a first transmission format;
   the wireless radio transceiver device transmitting an indicator to the access node to use a second transmission format for a later transmission resource to be transmitted to the wireless radio transceiver device;
   the wireless radio transceiver device receiving the later transmission resource at least partly using a candidate beam, the candidate beam being different from the first beam;
   the wireless radio transceiver device evaluating the candidate beam by comparing performance metrics between the candidate beam and the first beam; and
   the wireless radio transceiver device replacing the first beam with the candidate beam when the candidate beam has better performance metric than the first beam.

2. The method according to claim 1, wherein the wireless radio transceiver device is provided with more measurement opportunities in the second transmission format than in the first transmission format.

3. The method according to claim 1, wherein the second transmission format has at least one of a more robust coding and modulation scheme and more robust rank than the first transmission format.

4. The method according to claim 1, wherein more reference signals per transmission resource are transmitted by the access node in the second transmission format than in the first transmission format.

5. The method according to claim 1, wherein the performance metric is based on received power of the current transmission and the later transmission.

6. The method according to claim 1, wherein the candidate beam has a pointing direction and beam width, and wherein at least one of the pointing direction and the beam width is based on at least one of measurement statistics and physical properties of the wireless radio transceiver device.

7. The method according to claim 1, wherein the second transmission format is used only in the later transmission resource.

8. The method according to claim 1, wherein each transmission resource corresponds to a single orthogonal frequency-division multiplexing symbol, a single subframe, or a single Transmission Time Interval.

9. The method according to claim 1, wherein the indicator is a message comprising at least one of a Channel Quality Indictor, and Rank Indicator.

10. The method according to claim 1, wherein the indicator requests the access node to enable the wireless radio transceiver device to evaluate a candidate beam.

11. The method according to claim 1, wherein the indicator is a dedicated candidate beam evaluation message.

12. The method according to claim 1, further comprising:
obtaining an indication of at least one of drop in signal strength and channel rank of the transmission from the access node, and
wherein the indicator to use the second transmission format is transmitted in response thereto.

13. The method according to claim 1, wherein the indication is transmitted according to a schedule.

14. A wireless radio transceiver device for receiving transmission resources using beams, the wireless radio transceiver device comprising:
memory; and
processing circuitry coupled to the memory, the processing circuitry configured to:
receive, using a first beam, a current transmission resource from an access node using a first transmission format;
transmit an indicator to the access node to use a second transmission format for a later transmission resource to be transmitted to the wireless radio transceiver device;
receive the later transmission resource at least partly using a candidate beam, the candidate beam being different from the first beam;
evaluate the candidate beam by comparing performance metrics between the candidate beam and the first beam; and
replace the first beam with the candidate beam when the candidate beam has better performance metric than the first beam.

15. A wireless radio transceiver device for receiving transmission resources using beams, the wireless radio transceiver device comprising:
processing circuitry; and
a computer program product storing instructions that, when executed by the processing circuitry, causes the wireless radio transceiver device to:
receive, using a first beam, a current transmission resource from an access node using a first transmission format;
transmit an indicator to the access node to use a second transmission format for a later transmission resource to be transmitted to the wireless radio transceiver device;
receive the later transmission resource at least partly using a candidate beam, the candidate beam being different from the first beam;
evaluate the candidate beam by comparing performance metrics between the candidate beam and the first beam; and
replace the first beam with the candidate beam when the candidate beam has better performance metric than the first beam.

16. A wireless radio transceiver device for receiving transmission resources using beams, the wireless radio transceiver device comprising:
a receiver;
a transmitter;
memory;
processing circuitry coupled to the memory, receiver, and transmitter, wherein the processing circuitry is configured to:
employ the receiver to receive, using a first beam, a current transmission resource from an access node using a first transmission format;
employ the transmitter to transmit an indicator to the access node to use a second transmission format for a later transmission resource to be transmitted to the wireless radio transceiver device;
employ the receiver to receive the later transmission resource at least partly using a candidate beam, the candidate beam being different from the first beam;
evaluate the candidate beam by comparing performance metrics between the candidate beam and the first beam; and
replace the first beam with the candidate beam when the candidate beam has better performance metric than the first beam.

17. An access node comprising a radio transceiver device according to claim 14.

18. A wireless device comprising a radio transceiver device according to claim 14.

19. A computer program stored on a non-transitory computer readable storage medium for receiving transmission resources using beams, the computer program comprising computer code which, when run on processing circuitry of a wireless radio transceiver device, causes the wireless radio transceiver device to:
receive, using a first beam, a current transmission resource from an access node using a first transmission format;
transmit an indicator to the access node to use a second transmission format for a later transmission resource to be transmitted to the wireless radio transceiver device;
receive the later transmission resource at least partly using a candidate beam, the candidate beam being different from the first beam;
evaluate the candidate beam by comparing performance metrics between the candidate beam and the first beam; and
replace the first beam with the candidate beam when the candidate beam has better performance metric than the first beam.

20. A computer program product comprising the non-transitory computer readable storage medium on which the computer program according to claim 19 is stored.

* * * * *